G. WINGATE.
Baking-Molds.

No. 144,939. Patented Nov. 25, 1873.

George Wingate

UNITED STATES PATENT OFFICE.

GEORGE WINGATE, OF BOSTON, MASSACHUSETTS.

IMPROVEMENT IN BAKING-MOLDS.

Specification forming part of Letters Patent No. 144,939, dated November 25, 1873; application filed August 9, 1873.

*To all whom it may concern:*

Be it known that I, GEORGE WINGATE, of Boston, in the county of Suffolk and State of Massachusetts, have invented certain Improvements in Baking-Molds for Bread or Cakes, of which the following is a full, clear, and exact description, reference being had to the accompanying drawings making part of this specification, in which—

Figure 1:
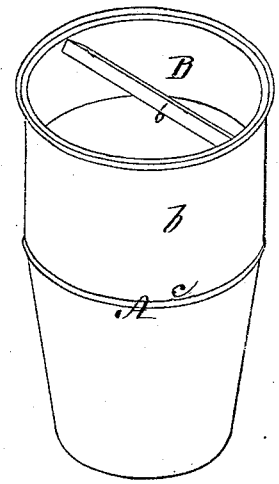
Figure 2:
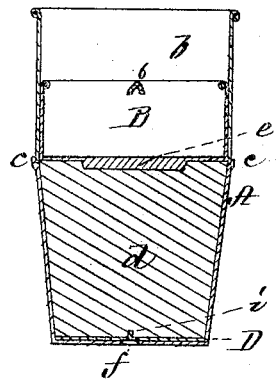
Figure 3:
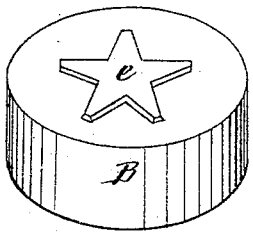
Figure 4:
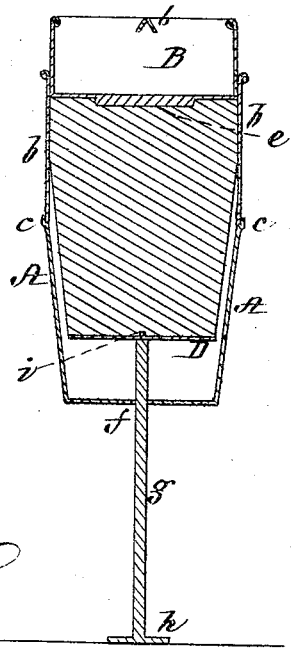
Figure 5:
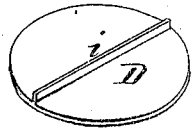

Figure 1 is a perspective view of my improved baking-mold. Fig. 2 is a vertical section through the center of the same with the dough therein. Fig. 3 is a perspective view of the sliding plug or cover inverted. Fig. 4 is a vertical section through the mold with the bread therein, illustrating the manner in which the bread or cake, when baked, is forced out of the mold. Fig. 5 is a perspective view of the plate or disk, which is placed on the bottom of the mold, and on which the bread rests.

Brown and steamed bread is usually baked in a metallic mold or pan provided with a tight-fitting cover. This cover is liable to be thrown up by the rising of the bread, thereby allowing the steam or moisture to escape, when the top of the bread becomes dry and hard, and is liable to separate from the loaf, and is, furthermore, often thrown out of shape.

My invention has for its object to overcome these difficulties; and consists in a mold or baking-pan having an extended top of uniform diameter throughout, within which is fitted a sliding plug or cover, which rests upon the upper surface of the bread or cake, and is forced up thereby as it rises, by which construction the escape of the moisture from the top of the bread is prevented, and the objections incident thereto entirely avoided; any suitable device being attached to the under side of the sliding cover if it should be desired to produce a figure or impression upon the top of the loaf. My invention also consists in providing the plate or false bottom on which the bread or cake rests with a rib projecting from its upper side, and extending across it to strengthen it, and also produce a crease or guide-mark by which to cut the loaf in halves; or in providing the upper side of the said plate or false bottom with letters or figures wherewith to stamp the bottom of the loaf with the name and address of the baker.

To enable others skilled in the art to understand and use my invention, I will proceed to describe the manner in which I have carried it out.

In the said drawings, A represents a baking-mold for bread or cake. This mold is provided with a top, *b*, extending up from the point *c*, and having its interior of uniform diameter throughout. B is a hollow plug or cover, which fits snugly within the top *b*, and is free to slide vertically therein, a bar, 6, extending across its top, by which it may be handled to insert or remove it. This cover rests on the top of the dough *d*, with which the mold is intended to be filled as high as the point *c*, as seen in Fig. 2; and thus, as the bread rises, it presses against the under side of the cover B, and forces it up, the length of the extended portion *b* of the mold being such that the rise of the bread or cake will not, in any case, cause the cover B to be thrown out therefrom.

The steam and moisture are thus always retained within the mold, thus preventing the top of the loaf of bread or cake from becoming dry and hard, or being thrown out of shape, events of frequent occurrence with molds as heretofore constructed.

In the event of the oven becoming overheated, a little water may be placed in the hollow sliding cover B for the purpose of cooling the top of the loaf, and preventing it from being too rapidly baked.

On the under side of the sliding cover B is an ornamental device, *e*, in relief, which sinks into the yielding dough when the cover rests thereon, and serves to make an impression in the top of the loaf. In case, however, it should not be desired to mark the top of the loaf, the device on the under side of the cover may be dispensed with.

I will now proceed to describe the device by which the bread or cake is forced out of the mold when baked. D is a circular metallic plate, of such diameter that it will lie on the bottom of the mold, the bread or cake resting directly thereon. At the center of the bottom of the mold is an opening, *f*, through which is inserted the end of a rod, *g*, provided with a base or stand, *h*, which is intended to rest on a bench or table; and thus, as the mold is forced down over this rod, as seen in Fig. 4, the plate D is forced away from the bottom of the mold, and the bread or cake is thus readily ejected, as desired.

In case the loaf should adhere to the plate D it can be readily separated therefrom by means of a knife; whereas, with an ordinary mold, the bread or cake often adheres to its bottom so firmly that, when taken out, a piece is broken off, which injures the appearance of the loaf.

$i$ is a projecting rib, which extends across the upper side of the plate D, and serves to produce a crease or guide-mark in the bottom of the loaf, by which to cut it in half, if desired. This rib also serves as a brace to strengthen the plate, and enable it to better withstand the thrust of the rod $g$.

The plate D may be provided with a figure or device for marking the bottom of the loaf, in addition to the rib $i$; or either can be used without the other.

What I claim as my invention, and desire to secure by Letters Patent, is—

1. The mold A, with its extended top $b$, in combination with a plug or cover sliding therein, and provided, or not, with a device to produce a mark or impression on the top of the loaf, substantially as described.

2. The plate or disk D, provided on its upper side with letters or figures, or with a rib or projection, $i$, extending across it, substantially as and for the purposes described.

Witness my hand this 4th day of August, A. D. 1873.

GEORGE WINGATE.

In presence of—
P. E. TESCHEMACHER,
N. W. STEARNS.